United States Patent
Kim

(10) Patent No.: US 8,784,758 B2
(45) Date of Patent: Jul. 22, 2014

(54) LNT CONTROL METHOD FOR VEHICLE

(71) Applicant: Hyundai Motor Company, Seoul (KR)

(72) Inventor: Pil Seung Kim, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/863,930

(22) Filed: Apr. 16, 2013

(65) Prior Publication Data

US 2014/0170042 A1   Jun. 19, 2014

(51) Int. Cl.
*B01D 53/94* (2006.01)
*F01N 3/10* (2006.01)
*F01N 3/18* (2006.01)

(52) U.S. Cl.
USPC ........ 423/212; 423/213.2; 422/105; 422/110; 422/111; 60/274; 60/295; 60/299; 60/301

(58) Field of Classification Search
USPC ............... 423/212, 213.2; 422/105, 110, 111; 60/274, 295, 299, 301
See application file for complete search history.

(56) References Cited

U.S. PATENT DOCUMENTS

| 7,565,799 | B2* | 7/2009 | Brown et al. | 60/295 |
| 2006/0174610 | A1* | 8/2006 | Brown et al. | 60/295 |
| 2007/0289291 | A1* | 12/2007 | Rabinovich et al. | 60/286 |
| 2009/0077951 | A1 | 3/2009 | Arlt et al. | |
| 2012/0180454 | A1* | 7/2012 | Argolini et al. | 60/274 |

FOREIGN PATENT DOCUMENTS

| DE | 10 2007 044 937 A1 | 4/2009 |
| DE | 10 2008 059 698 A1 | 6/2010 |
| JP | 4254505 B2 | 2/2009 |
| KR | 10-0362357 B1 | 11/2002 |
| KR | 10-2012-0038797 A | 4/2012 |
| WO | WO 03/031780 A1 | 4/2003 |
| WO | WO 03/047732 A1 | 6/2003 |
| WO | WO 2010/060503 A1 | 6/2010 |

* cited by examiner

*Primary Examiner* — Timothy Vanoy
(74) *Attorney, Agent, or Firm* — Morgan, Lewis & Bockius LLP

(57) ABSTRACT

An LNT (Lean NOx Trap) control method for vehicles increases a purification rate of NOx while preventing an increase in the amount of slip of separated NOx at a relatively low LNT temperature. The method includes a recycle necessity determining step that determines whether to recycle NOx of a LNT in accordance with an amount of adsorbed NOx, a LNT temperature determining step that determines whether a temperature of the LNT is below a predetermined reference temperature, a rich performing step that performs a rich mode when the temperature of the LNT is equal to the reference temperature or above and a pre-rich step that ejects fuel in a rich state when the temperature of the LNT is below the reference temperature.

6 Claims, 3 Drawing Sheets

LNT CONTROL METHOD FOR VEHICLE

CROSS-REFERENCE TO RELATED APPLICATION

The present application claims priority of Korean Patent Application Number 10-2012-0148621 filed Dec. 18, 2012, the entire contents of which application are incorporated herein for all purposes by this reference.

BACKGROUND OF INVENTION

1. Field of Invention

The present invention relates to a LNT (Lean NOx Trap) control method for a vehicle, and more particularly, a technology of implementing a rich mode to be able to improve performance of purifying NOx of LNTs.

2. Description of Related Art

A LNT (Lean NOx Trap) is a purifying device that adsorbs NOx in an exhaust gas and reduces the adsorbed NOx into N2 using a reducer such as HC and CO in a rich exhaust gas in a rich mode, which is a rich combustion state.

However, the whole NOx separated from LNT in the rich mode described above is not reduced and some of NOx is exhausted, and this phenomenon is called slip of NOx and the ratio of NOx reduced from the LNT, not being slipped, is called NOx conversion ratio.

The slip of NOx is significantly influenced by the NOx conversion ratio which varies according to the temperature of the LNT. FIG. 1 exemplifies a NOx conversion ratio as a function of LNT temperature and it can be seen from the figure that the NOx conversion ratio increases with the increase in temperature, in the section of 200~350° C., but the NOx conversion ratio decreases with the increase in temperature in the section of 350° C. or above.

It can be seen from FIG. 1 that it is effective to perform a rich mode at the position where 50% or more can be converted, when NOx adsorbed to LNT is reduced to N2; otherwise, a large amount of NOx slips without being reduced to N2 in the rich mode.

In the related art, when the amount of NOx adsorbed to LNT increases, it enters a rich mode, reduction of NOx is started, and then the amount of NOx adsorbed to the LNT becomes zero or the lambda sensor values at the front and rear ends of the LNT become the same or substantially the same, it is determined that it is because the entire NOx adsorbed to the LNT has been reduced, and the rich mode is ended.

As described above, controlling a rich mode of a LNT does not consider a purification rate of NOx as a function of the temperature of the LNT, therefore when it enters the rich mode in a region with a low LNT temperature, NOx separated from the LNT and slipping increases.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for has been made in an effort to solve the problems.

Various aspects of the present invention provide for a LNT control method for a vehicle which can increase a purification rate of NOx while preventing an increase in the amount of slipping of NOx separated at a relatively low LNT temperature, by changing a rich mode in accordance with the temperature of a LNT in a vehicle equipped with the LNT.

In various aspects of the present invention, a LNT control method for a vehicle includes a recycle necessity determining step that determines whether to recycle NOx of a LNT in accordance with an amount of adsorbed NOx, a LNT temperature determining step that determines whether a temperature of the LNT is below a predetermined reference temperature, when it is determined in the recycle necessity determining step that it is necessary to recycle the NOx of the LNT. The LNT control method also includes a rich performing step that performs a rich mode, when the temperature of the LNT is equal to the reference temperature or above, and a pre-rich step that ejects fuel in a rich state before the rich performing step is conducted, when the temperature of the LNT is below the reference temperature. The reference temperature may be set to a temperature that corresponds to a maximal NOx conversion ratio.

The LNT control method may further include a rich mode separation step that keeps a lean state for a predetermined time period. The rich mode separation step may be conducted before the rich performing step and after the pre-rich step.

The pre-rich step may be set to be maintained for a time period shorter than that of the rich performing step and the rich mode separation step may be set to be maintained for a time period until the temperature of the LNT increased by the pre-rich step is reflected to a carrier temperature of the LNT.

Also, the LNT control method may further include a rich mode ending step that determines whether conditions to end the rich mode are satisfied and ends the rich mode when the conditions to end the rich mode are satisfied. The rich mode ending step may be conducted after the rich performing step. The conditions to end the rich mode may be satisfied when an amount of NOx adsorbed to the LNT becomes zero or when lambda sensor values at front and rear ends of the LNT become substantially the same by performing the rich performing step.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
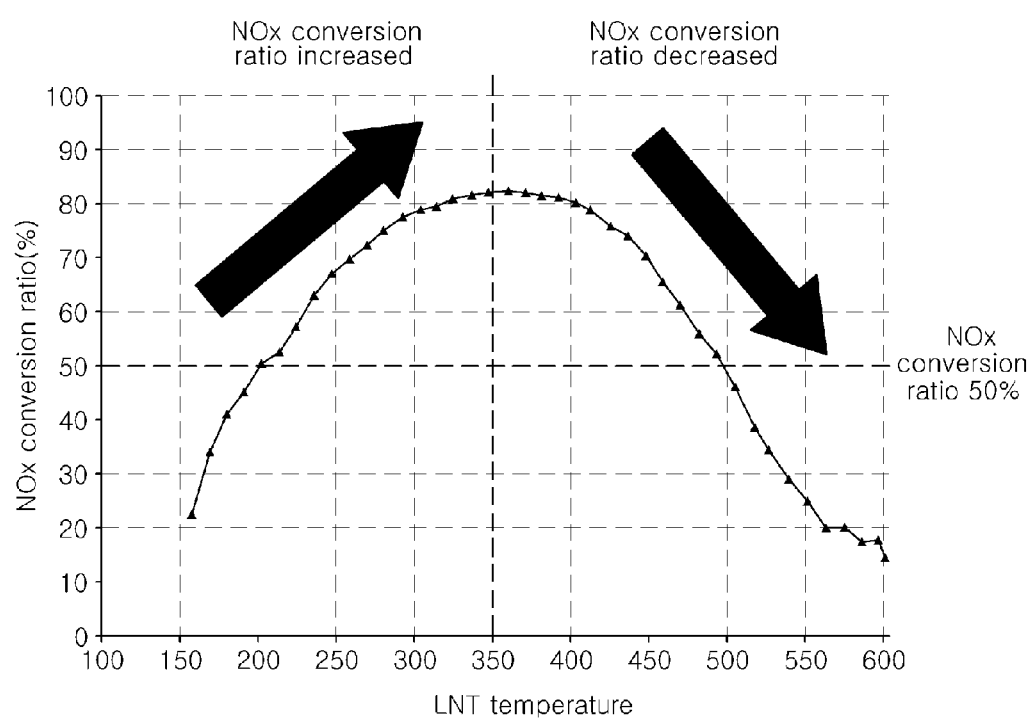
FIG. 1 is a graph showing a NOx conversion ratio as a function of the LNT temperature.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In the figures, reference numbers refer to the same or equivalent parts of the present disclosure throughout the several figures of the drawing.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
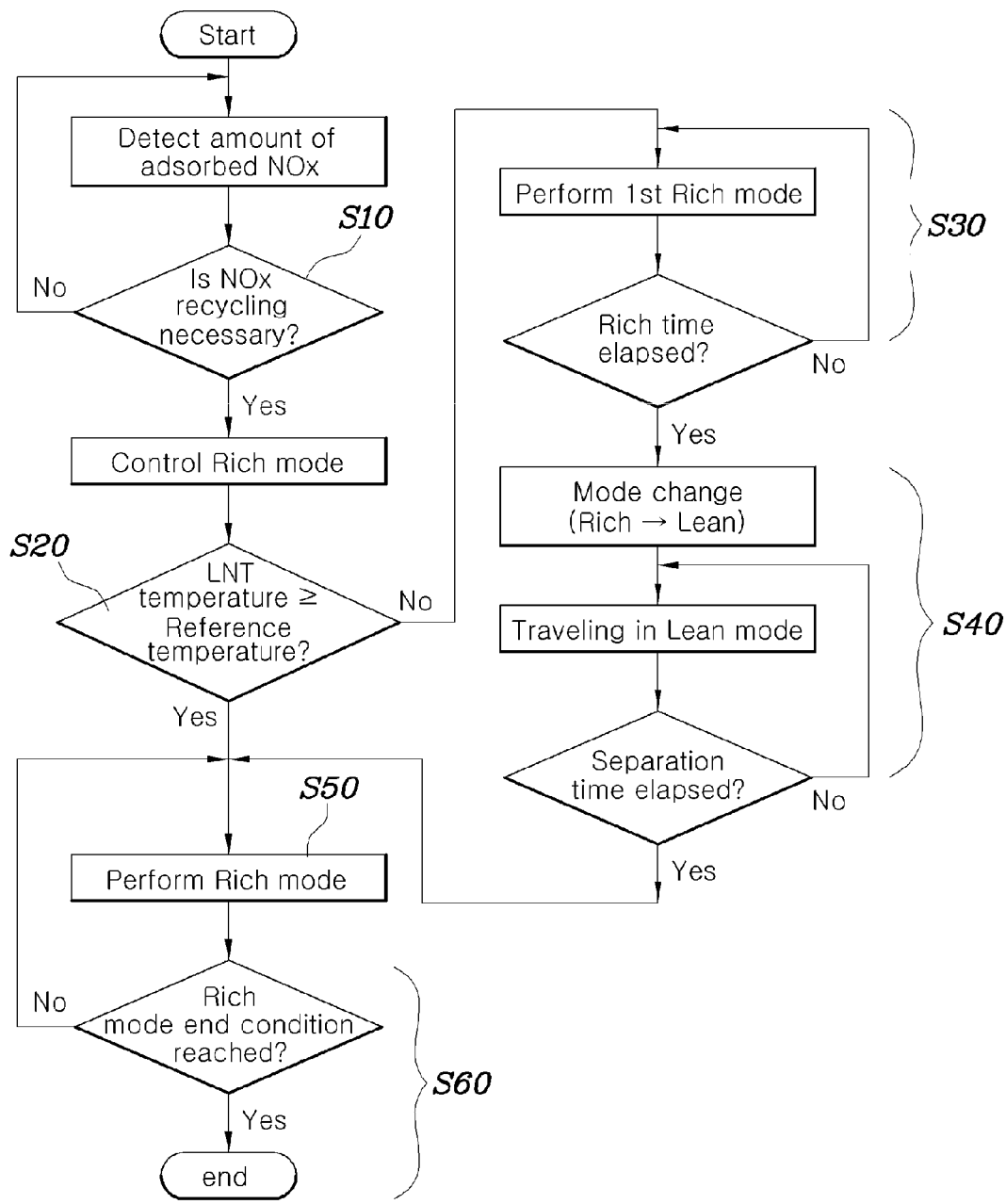
FIG. 2 is a flowchart illustrating an exemplary LNT control method for vehicle according to various aspects of the present invention.
Figure 3:
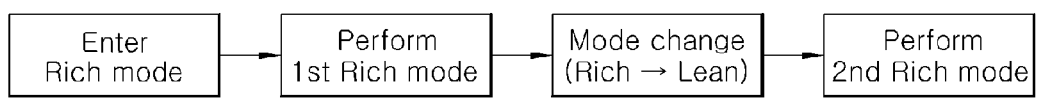
FIG. 3 is an exemplary block diagram illustrating an exemplary LNT control method for a vehicle according to various aspects of the present invention.
Figure 4:
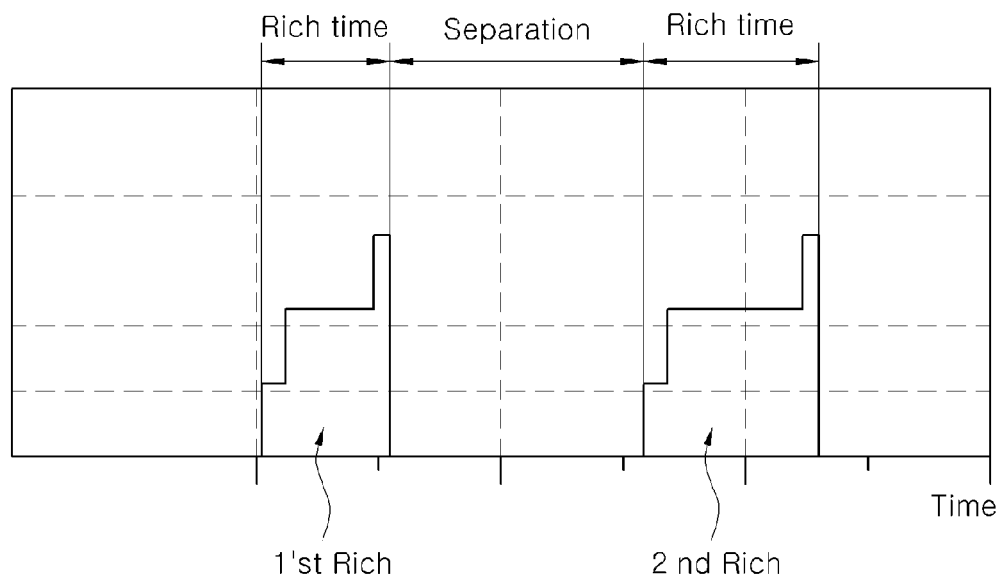
FIG. 4 is a graph showing an exemplary rich mode of an exemplary LNT control method for a vehicle according to various aspects of the present invention.

Referring to FIGS. 2 to 4, a LNT control method for a vehicle according to various embodiments of the present invention includes a recycle necessity determining step S10 that determines whether to recycle NOx of a LNT in accordance with the amount of adsorbed NOx. The LNT control method also includes a LNT temperature determining step S20 that determines whether the temperature of a LNT is below a predetermined reference temperature, when it is determined in the recycle necessity determining step S10 that it is necessary to recycle NOx of the LNT. The LNT control method further includes a rich performing step S50 that performs a rich mode, when the LNT temperature is equal to the reference temperature or above, and a pre-rich step S30 that ejects fuel in a rich state before the rich performing step S50 is conducted, when the LNT temperature is below the reference temperature.

In various embodiments, the reference temperature for determining the LNT temperature is set to a temperature where a NOx conversion ratio as a function of the temperature of a LNT is at the maximum, and for example, it is about 350° C. for the LNT shown in FIG. 1.

That is, when it is determined that it is necessary to recycle NOx in the recycle necessity determining step S10, the rich performing step S50 is performed after the pre-rich step S30 when the LNT temperature is determined as being below the reference temperature by the LNT temperature determining step S20. That is, the rich mode is performed partially in two stages, so that the efficiency of recycling NOx can be more improved by performing the rich mode with the NOx conversion ratio of the LNT increased. This is achieved by performing the rich performing step S50, which is a main rich mode, after the temperature of the LNT is increased by the pre-rich step S30 when the LNT temperature is determined as being below the reference temperature.

On the other hand, when the temperature of the LNT is equal to the reference temperature or above, the rich-performing step S50 is performed without performing the pre-rich step S30.

A rich mode separation step S40 that keeps a lean state for a predetermined time is conducted before the rich performing step S50 and after the pre-rich step S30.

The pre-rich step S30 may be set to be maintained for a short time compared with the rich performing step S50 and the rich mode separation step S40 may be set to be maintained for the time until the temperature increased by the pre-rich step S30 is reflected to the carrier temperature of the LNT.

After the rich performing step S50, a rich mode ending step S60 that ends the rich mode by determining whether conditions to end the rich mode are satisfied is performed, and in the rich mode ending step S60, when the amount of NOx adsorbed to the LNT becomes zero or the lambda sensor values at the front and rear ends of the LNT become the same or substantially the same by performing the rich performing step S50, it is determined that the conditions to end the rich mode are satisfied.

As described above, various aspects of the present invention make it possible, in performing the rich mode, to increase purification efficiency of a LNT by reducing the amount of slip of NOx and allowing sufficient reduction, by performing the rich performing step S50 with the carrier temperature of the LNT increased by performing the pre-rich step S30 and the rich mode separation step S40, when the temperature of the LNT is below the reference temperature.

various aspects of the present invention make it possible to increase a purification rate of NOx while preventing an increase in the amount of slip of separated NOx at a relatively low LNT temperature by changing a rich mode in accordance with the temperature of a LNT in a vehicle equipped with a LNT.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A LNT (Lean NOx Trap) control method for a vehicle, comprising:
   - a recycle necessity determining step that determines whether to recycle NOx of a LNT in accordance with an amount of adsorbed NOx;
   - a LNT temperature determining step that determines whether a temperature of the LNT is below a predetermined reference temperature, when it is determined in the recycle necessity determining step that it is necessary to recycle the NOx of the LNT;
   - a rich performing step that performs a rich mode, when the temperature of the LNT is equal to the reference temperature or above; and
   - a pre-rich step that ejects fuel in a rich state before the rich performing step is conducted, when the temperature of the LNT is below the reference temperature.

2. The method of claim 1, further comprising a rich mode separation step that keeps a lean state for a predetermined time period, wherein the rich mode separation step is conducted before the rich performing step and after the pre-rich step.

3. The method of claim 2, wherein the pre-rich step is set to be maintained for a time period shorter than that of the rich performing step and the rich mode separation step is set to be maintained for a time period until the temperature of the LNT increased by the pre-rich step is reflected to a carrier temperature of the LNT.

4. The method of claim 1, further comprising a rich mode ending step that determines whether conditions to end the rich mode are satisfied and ends the rich mode when the conditions to end the rich mode are satisfied, wherein the rich mode ending step is conducted after the rich performing step.

5. The method of claim 4, wherein the conditions to end the rich mode are satisfied when the amount of adsorbed NOx to the LNT becomes zero or when lambda sensor values at front and rear ends of the LNT become substantially the same by performing the rich performing step.

6. The method of claim 1, wherein the reference temperature is set to a temperature that corresponds to a maximal NOx conversion ratio.

\* \* \* \* \*

UNITED STATES PATENT AND TRADEMARK OFFICE
CERTIFICATE OF CORRECTION

| | |
|---|---|
| PATENT NO. | : 8,784,758 B2 |
| APPLICATION NO. | : 13/863930 |
| DATED | : July 22, 2014 |
| INVENTOR(S) | : Pil Seung Kim |

Page 1 of 1

It is certified that error appears in the above-identified patent and that said Letters Patent is hereby corrected as shown below:

On the title page, insert priority data as follows:

--(30)  Foreign Application Priority Data:

December 18, 2012  (KR) .................. 10-2012-0148621--

Signed and Sealed this
Thirtieth Day of September, 2014

Michelle K. Lee
*Deputy Director of the United States Patent and Trademark Office*